US 9,001,903 B2

(12) United States Patent
Baba

(10) Patent No.: US 9,001,903 B2
(45) Date of Patent: Apr. 7, 2015

(54) COMMUNICATION SYSTEM, COMMUNICATION DEVICE, AND METHOD FOR OPERATING COMMUNICATION SYSTEM

(75) Inventor: Eiji Baba, Nara (JP)

(73) Assignee: MegaChips Corporation, Osaka-shi (JP)

(*) Notice: Subject to any disclaimer, the term of this patent is extended or adjusted under 35 U.S.C. 154(b) by 0 days.

(21) Appl. No.: 14/119,660

(22) PCT Filed: Mar. 8, 2012

(86) PCT No.: PCT/JP2012/055991
§ 371 (c)(1),
(2), (4) Date: Nov. 22, 2013

(87) PCT Pub. No.: WO2012/164993
PCT Pub. Date: Dec. 6, 2012

(65) Prior Publication Data
US 2014/0093001 A1     Apr. 3, 2014

(30) Foreign Application Priority Data

May 31, 2011   (JP) .................................. 2011-122164

(51) Int. Cl.
*H04L 27/00*   (2006.01)
*H04L 27/28*   (2006.01)
(Continued)

(52) U.S. Cl.
CPC .............. *H04B 3/54* (2013.01); *H04L 27/2601* (2013.01); *H04B 2203/5416* (2013.01); *H04B 2203/542* (2013.01)

(58) Field of Classification Search
USPC ......... 375/219, 259, 260, 257, 256, 355, 354, 375/358, 362, 363, 364, 365, 366, 377; 340/FOR. 465, 538, 12.32, 13.23, 340/FOR. 405; 455/402, FOR. 202; 370/503, 509, 510, 511, 512, 513, 514
See application file for complete search history.

(56) References Cited

U.S. PATENT DOCUMENTS 4,225,964 A * 9/1980 Cagle et al. .................. 375/332
4,988,972 A 1/1991 Takagi
(Continued)

FOREIGN PATENT DOCUMENTS

CN   101107788 A   1/2008
CN   101185252 A   5/2008
(Continued)

OTHER PUBLICATIONS

Combined Chinese Office Action and Search Report issued Aug. 15, 2014 in Patent Application No. 201280026137.3 (with English language translation based on Japanese translation).
(Continued)

*Primary Examiner* — Tesfaldet Bocure
(74) *Attorney, Agent, or Firm* — Oblon, McClelland, Maier & Neustadt, L.L.P.

(57) ABSTRACT

A communication system includes a first communication device and a second communication device for performing power line communication using a power line as a transmission line with the first communication device, and in the communication system, the first communication device includes a detection mechanism for detecting a zero crossing timing of a commercial power supply and transmitting mechanism for transmitting a transmission signal modulated in OFDM mode at the zero crossing timing, the transmitting mechanism first transmits a header signal having a preamble as the transmission signal when the power line communication is started, and the transmitting mechanism transmits a data signal having no preamble as the transmission signal after the header signal is transmitted, and the second communication device includes a receiving mechanism for performing a demodulation process on the transmission signal which is received, to thereby obtain receiving data.

8 Claims, 11 Drawing Sheets

(51) Int. Cl.
*H04L 7/00* (2006.01)
*H04J 3/06* (2006.01)
*H04B 3/54* (2006.01)
*H04L 27/26* (2006.01)

(56) References Cited

U.S. PATENT DOCUMENTS

| | | | |
|---|---|---|---|
| 5,570,390 | A | 10/1996 | Kaku et al. |
| 8,542,754 | B2 * | 9/2013 | Guerrieri et al. ............... 375/257 |
| 2004/0022175 | A1 | 2/2004 | Bolinth et al. |
| 2013/0101003 | A1 * | 4/2013 | Vedantham et al. .......... 375/224 |
| 2013/0259108 | A1 | 10/2013 | Baba |

FOREIGN PATENT DOCUMENTS

| | | |
|---|---|---|
| CN | 101218756 A | 7/2008 |
| CN | 101803220 A | 8/2010 |
| JP | 2 108331 | 4/1990 |
| JP | 5 207001 | 8/1993 |
| JP | 8 18484 | 1/1996 |
| JP | 2002 111553 | 4/2002 |
| JP | 2002 135177 | 5/2002 |
| JP | 2009 284159 | 12/2009 |

OTHER PUBLICATIONS

International Preliminary Report on Patentability and Written Opinion issued Dec. 12, 2013 in PCT/JP2012/055991 (with English language translation).
International Search Report Issued Apr. 3, 2012 in PCT/JP12/055991 Filed Mar. 8, 2012.

* cited by examiner

COMMUNICATION SYSTEM, COMMUNICATION DEVICE, AND METHOD FOR OPERATING COMMUNICATION SYSTEM

TECHNICAL FIELD

The present invention relates to a communication technique.

BACKGROUND ART

In recent years, power line communication (PLC) using a power line for supplying power to electric equipments has been put into practical use. In the power line communication, communication is performed by superimposing a transmission signal having a frequency higher than a commercial power supply frequency on the commercial power.

Since the power line communication is, however, achieved in a communication mode in which a power line to which home electric equipments are connected is used as a transmission line, the quality of the power line communication is sometimes deteriorated due to the effect of the noise of the home electric equipments (also referred to as "home appliance noise").

Since the effect of this home appliance noise becomes larger near the peak at which the amplitude of a commercial alternating current (AC) voltage waveform reaches its peak, in order to avoid this effect of the home appliance noise, proposed is a technique for performing the power line communication near a so-called zero crossing at which the amplitude of the AC voltage waveform becomes zero (for example, Patent Document 1).

PRIOR-ART DOCUMENTS

Patent Documents

[Patent Document 1] Japanese Patent Application Laid Open Gazette No. 2009-284159

DISCLOSURE OF INVENTION

Problems to be Solved by the Invention

Since the power line communication near the zero crossing is communication in a short time period, however, the transmission capacity is small.

Further, in a case where transmission signals in a multicarrier modulation system using OFDM (Orthogonal Frequency Division Multiplexing) are transmitted in time-series distribution, generally, a receiving timing cannot be specified on a receiving side, and therefore symbol timing synchronization has to be performed for each of the transmission signals which are distributedly received. In order to perform the symbol timing synchronization for each of the transmission signals which are distributedly received, a preamble signal to be used for the symbol timing synchronization process has to be added to the transmission signal.

When the preamble signal is added to each of the transmission signals which are distributedly transmitted, however, the transmission capacity allocated to actual transmission data becomes still smaller.

Then, it is an object of the present invention to provide a technique for efficiently transmitting transmission data in a case where power line communication using an OFDM signal is performed near a zero crossing.

Means for Solving the Problems

The present invention is intended for a communication system. According to a first aspect of the present invention, the communication system includes a first communication device and a second communication device for performing power line communication using a power line as a transmission line with the first communication device, and in the communication system of the present invention, the first communication device has a detection means for detecting a zero crossing timing of a commercial power supply and a transmitting means for transmitting a transmission signal modulated in OFDM mode at the zero crossing timing, the transmitting means first transmits a first transmission signal having a preamble as the transmission signal when the power line communication is started and the transmitting means transmits a second transmission signal having no preamble as the transmission signal after the first transmission signal is transmitted, and the second communication device has a receiving means for performing a demodulation process on the transmission signal which is received, to thereby obtain receive data.

According to a second aspect of the present invention, in the communication system of the first aspect of the present invention, the second communication device further has a synchronization means for performing a symbol synchronization process by using the preamble of the first transmission signal, to thereby acquire symbol synchronization information, and when the second transmission signal is received, the receiving means specifies a symbol synchronization timing for the second transmission signal which is received, by using a zero crossing interval indicating an interval between adjacent zero crossing timings and the symbol synchronization information, to thereby perform the demodulation process on the second transmission signal.

According to a third aspect of the present invention, in the communication system of the second aspect of the present invention, the zero crossing interval is an interval specified on the basis of a known frequency of a commercial power supply.

According to a fourth aspect of the present invention, in the communication system of the second aspect of the present invention, the first communication device further has a generation means for generating auxiliary information indicating the zero crossing interval on the basis of the zero crossing timing detected by the detection means, the transmitting means transmits the first transmission signal including the auxiliary information, the receiving means performs the demodulation process on the first transmission signal including the auxiliary information, to thereby acquire the auxiliary information as the receive data, and the second communication device specifies the zero crossing interval on the basis of the auxiliary information acquired by the receiving means.

According to a fifth aspect of the present invention, in the communication system of the fourth aspect of the present invention, the transmitting means transmits the first transmission signal including a pilot signal, and the receiving means has a transmission line estimating means for estimating transmission line characteristics by using the pilot signal included in the first transmission signal which is received, to thereby acquire estimated transmission line characteristics and an equalization means for performing an equalization process to correct a phase of a data symbol included in the second transmission signal, by using transmission line estimation information on a phase included in the estimated transmission line characteristics and the auxiliary information.

According to a sixth aspect of the present invention, in the communication system of the first aspect of the present invention, the first communication device further has a generation means for generating auxiliary information indicating a zero crossing interval on the basis of the zero crossing timing detected by the detection means, the second communication device further has a synchronization means for performing a symbol synchronization process by using the preamble of the first transmission signal, to thereby acquire symbol synchronization information, the transmitting means transmits the second transmission signal including the auxiliary information at a predetermined zero crossing timing, the receiving means performs the demodulation process on the second transmission signal including the auxiliary information, to thereby acquire the auxiliary information as the receive data, and the receiving means specifies a symbol synchronization timing for the second transmission signal to be transmitted at the next zero crossing timing after the predetermined zero crossing timing, by using the zero crossing interval specified on the basis of the auxiliary information which is acquired and the symbol synchronization information.

The present invention is also intended for a communication device for performing power line communication using a power line as a transmission line. According to the present invention, the communication device includes a detection means for detecting a zero crossing timing of a commercial power supply and a transmitting means for transmitting a transmission signal modulated in OFDM mode at the zero crossing timing, and in the communication device of the present invention, the transmitting means first transmits a first transmission signal having a preamble as the transmission signal when the power line communication is started, and the transmitting means transmits a second transmission signal having no preamble as the transmission signal after the first transmission signal is transmitted.

The present invention is further intended for a method of operating a communication system which includes a first communication device and a second communication device for performing power line communication using a power line as a transmission line with the first communication device. According to the present invention, the method includes the steps of a) detecting a zero crossing timing of a commercial power supply in the first communication device, b) transmitting a transmission signal modulated in OFDM mode at the zero crossing timing in the first communication device, and c) performing a demodulation process on the transmission signal which is received in the second communication device, to thereby acquire receive data, and in the method of the present invention, a first transmission signal having a preamble is first transmitted as the transmission signal when the power line communication is started and a second transmission signal having no preamble is transmitted as the transmission signal after the first transmission signal is transmitted in the step b).

Effects of the Invention

According to the present invention, it is possible to efficiently transmit transmission data in a case where the power line communication using an OFDM signal is performed near a zero crossing.

These and other objects, features, aspects and advantages of the present invention will become more apparent from the following detailed description of the present invention when taken in conjunction with the accompanying drawings.

BEST MODE FOR CARRYING OUT THE INVENTION

Hereinafter, with reference to figures, the preferred embodiment of the present invention will be discussed. Further, in different figures, identical or corresponding constituent elements are represented by the same reference signs.

1. Preferred Embodiment

[1-1. Constitution of Communication System]

Figure 1:
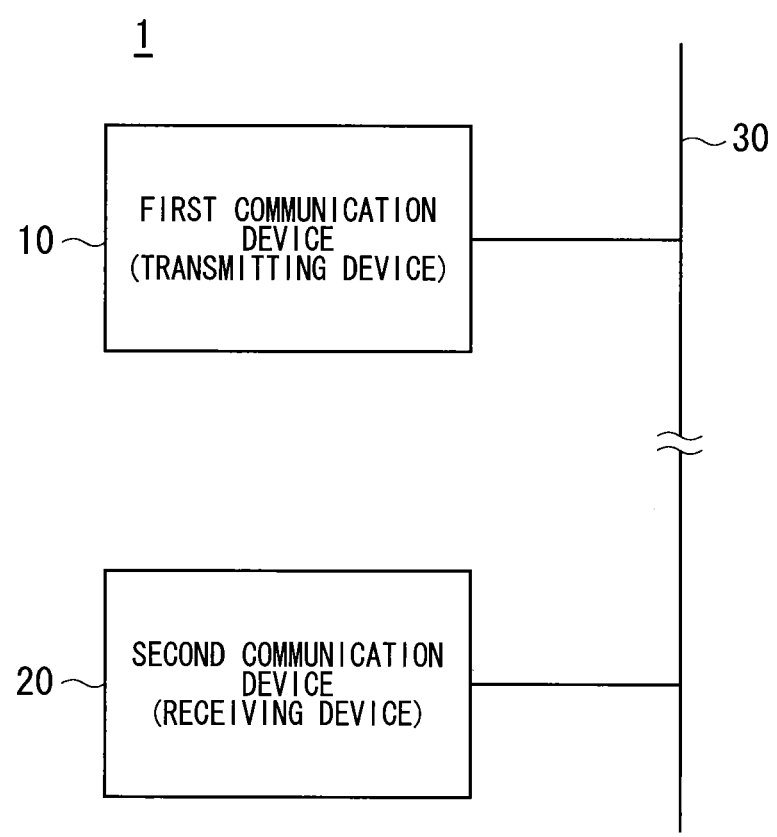
FIG. 1 is a view showing a constitution of a communication system in accordance with a preferred embodiment of the present invention.

FIG. 1 is a view showing a constitution of a communication system 1 in accordance with the preferred embodiment of the present invention.

As shown in FIG. 1, the communication system 1 has a first communication device 10 and a second communication device 20. The first communication device 10 and the second communication device 20 in the communication system 1 are each connected to a power line 30. Then, the first communication device 10 and the second communication device 20 are configured to be communicable with each other by power line communication (PLC) using the power line 30 as a transmission line.

Further, the power line communication between the first communication device 10 and the second communication device 20 is performed by using an OFDM (Orthogonal Frequency Division Multiplexing) signal which is obtained by combining a plurality of subcarriers which are orthogonal to one another on a frequency axis.

Though a case where the first communication device 10 serves as a transmitting device and the second communication device 20 serves as a receiving device will be hereinafter discussed as an example, the present invention is not limited to the case. The first communication device 10 has at least a transmitting function and may have a receiving function besides the transmitting function. Similarly, the second communication device 20 has at least a receiving function and may have a transmitting function besides the receiving function.

Figure 2:
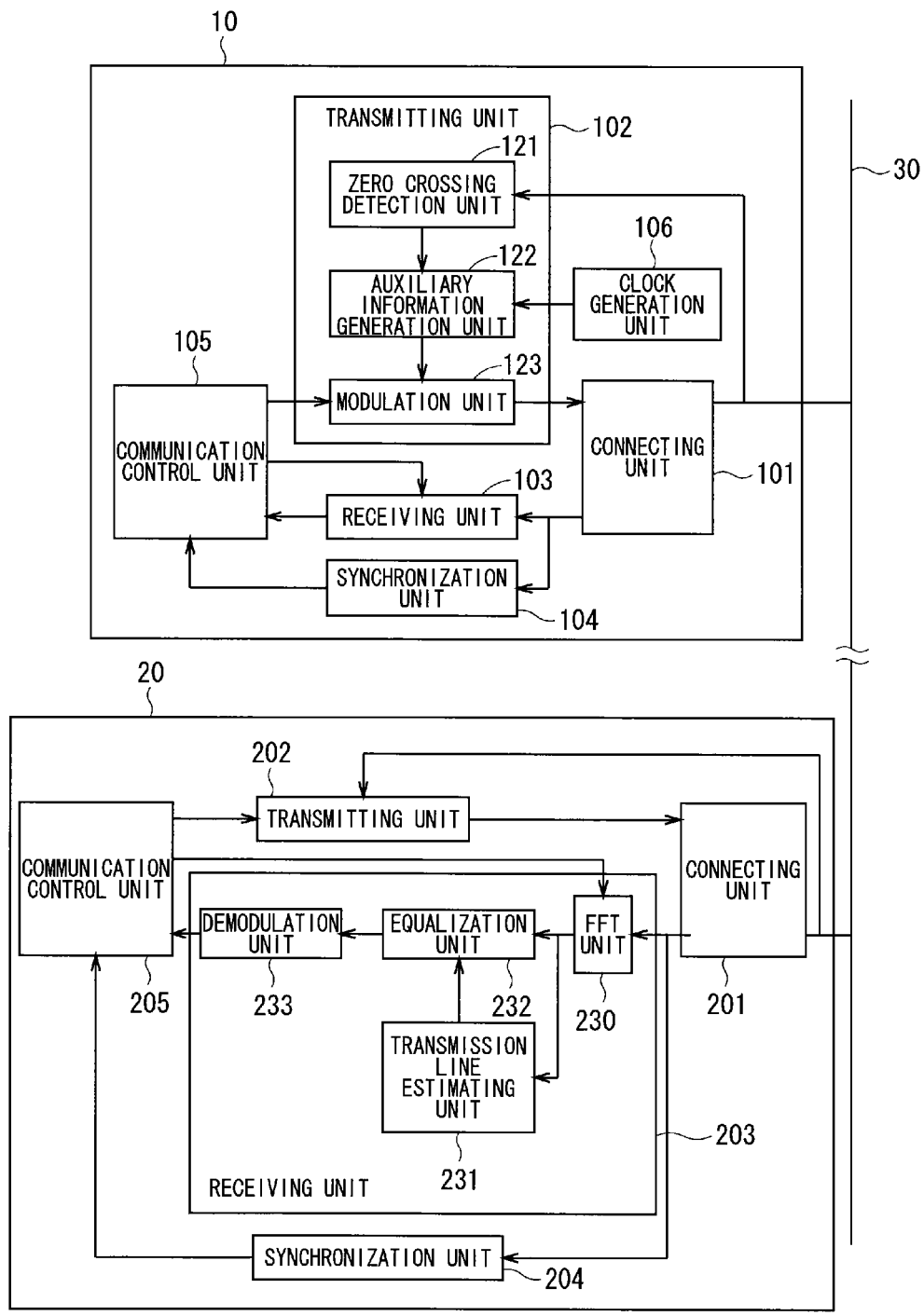
FIG. 2 is a block diagram showing respective functional constitutions of a first communication device and a second communication device.

Hereinafter, respective constitutions of the first communication device 10 and the second communication device 20 which constitute the communication system 1 will be discussed in this order. FIG. 2 is a block diagram showing respective functional constitutions of the first communication device 10 and the second communication device 20.

As shown in FIG. 2, the first communication device (transmitting device) 10 comprises a connecting unit 101, a transmitting unit 102, a receiving unit 103, a synchronization unit 104, and a communication control unit 105.

The connecting unit 101 is connected to the power line 30 and has a function of converting an OFDM signal inputted from the transmitting unit 102 into a transmission signal (PLC signal) used for the power line communication and outputting the PLC signal to the power line 30. Further, the connecting unit 101 has another function of taking the PLC signal out from the power line 30 and outputting the PLC signal to the receiving unit 103 as a received signal.

The transmitting unit 102 has a zero crossing detection unit 121, an auxiliary information generation unit 122, and a modulation unit 123, and acquires transmission data from the communication control unit 105, modulates the transmission data, and generates the OFDM signal including the transmission data.

Specifically, the zero crossing detection unit (detection means) 121 detects a timing (also referred to as a "zero crossing timing") at which the amplitude of a commercial alternating current (AC) voltage waveform becomes zero and outputs a detection signal in synchronization with the detected zero crossing timing.

The auxiliary information generation unit (generation means) 122 generates auxiliary information (also referred to as "index information" or "marker information") indicating a zero crossing interval on the basis of the detection signal outputted from the zero crossing detection unit 121. The auxiliary information is represented by a count value (count number) obtained by counting clock signals outputted from the clock generation unit 106. In other words, the auxiliary information generation unit 122 counts the number of clocks of the clock signals during a period from the input of the detection signal indicating the zero crossing timing to the input of the next detection signal and outputs the obtained count value as the auxiliary information indicating the zero crossing interval.

The modulation unit 123 generates an OFDM symbol on the basis of the transmission data inputted from the communication control unit 105 and the auxiliary information inputted from the auxiliary information generation unit 122 and performs an inverse fast Fourier transform on the OFDM symbol, to thereby generate the OFDM signal. The generated OFDM signal is outputted to the connecting unit 101.

The receiving unit 103 has a function of demodulating the received signal inputted from the connecting unit 101 and generating receive data. The receive data generated by the receiving unit 103 is outputted to the communication control unit 105.

The synchronization unit 104 performs various synchronization processes such as frequency synchronization, symbol timing synchronization (symbol synchronization), and the like in cooperation with the communication control unit 105. The synchronization process will be discussed later in detail.

The communication control unit 105 controls various operations in the first communication device 10. Specifically, the communication control unit 105 generates the transmission data and outputs the transmission data to the modulation unit 123 of the transmitting unit 102. Then, the communication control unit 105 controls the connecting unit 101 to output the transmission signal at the zero crossing timing specified on the basis of the detection signal from the zero crossing detection unit 121. Thus, the connecting unit 101 serves as a transmitting means in cooperation with the communication control unit 105. Further, the communication control unit 105 acquires the receive data demodulated by the receiving unit 103 and performs a predetermined process on the basis of the receive data.

Next, detailed discussion will be made on the constitution of the second communication device (receiving device) 20. Since the second communication device 20 has the same constitution as that of the first communication device 10, herein, a characteristic part (a constitution of the receiving unit 203) as the receiving device will be discussed in more detail.

As shown in FIG. 2, the second communication device 20 comprises a connecting unit 201, a transmitting unit 202, a receiving unit 203, a synchronization unit 204, and a communication control unit 205.

The connecting unit 201 has the same function as that of the above-discussed connecting unit 101. Specifically, the connecting unit 201 is connected to the power line 30 and has a function of converting the OFDM signal inputted from the transmitting unit 202 into the PLC signal and outputting the PLC signal to the power line 30. Further, the connecting unit 201 has another function of taking the PLC signal out from the power line 30 and outputting the PLC signal to the receiving unit 203 as the received signal.

The transmitting unit 202 acquires transmission data from the communication control unit 205, modulates the transmission data, and generates the OFDM signal including the transmission data, like the above-discussed transmitting unit 102.

The receiving unit (receiving means) 203 has an FFT unit 230, a transmission line estimating unit 231, an equalization unit 232, and a demodulation unit 233, and has a function of demodulating the received signal inputted from the connecting unit 201 to thereby generate the receive data.

Specifically, the FFT unit 230 performs a so-called multicarrier demodulation process for performing a fast Fourier transform on the received signal to thereby convert a signal in a time region into a signal in a frequency region. The received signal outputted from the FFT unit 230, after being subjected to the multicarrier demodulation process, is inputted to the transmission line estimating unit 231 and the equalization unit 232.

The transmission line estimating unit (transmission line estimating means) 231 calculates transmission line characteristics of a subcarrier which transmits a pilot signal (transmission line characteristics of the pilot signal) by using the pilot signal included in the received signal. Then, the transmission line estimating unit 231 performs an interpolation process by using the transmission line characteristics of the pilot signal, to thereby estimate transmission line characteristics of a subcarrier which transmits a signal other than the pilot signal. The transmission line characteristics (also referred to as "estimated transmission line characteristics") of the signal other than the pilot signal, which is obtained by such a transmission line estimation process, is outputted to the equalization unit 232.

The equalization unit (equalization means) 232 performs an equalization process of dividing the received signal by the estimated transmission line characteristics corresponding to the received signal. The received signal outputted from the equalization unit 232, after being subjected to the equalization process, is outputted to the demodulation unit 233.

The demodulation unit 233 performs a subcarrier demodulation process such as a demapping process of the received signal after being subjected to the equalization process, or the like, and outputs the demodulated receive data to the communication control unit 205. In the preferred embodiment, the demodulation process is a concept of process including at least one of the multicarrier demodulation process and the subcarrier demodulation process.

The synchronization unit (synchronization means) 204 performs various synchronization processes such as frequency synchronization to control an error of a carrier frequency, symbol timing synchronization to detect the OFDM signal inputted to the second communication device 20 and perform synchronization of timing between the OFDM symbol and the multicarrier demodulation process, and the like in cooperation with the communication control unit 205, to thereby acquire synchronization information.

The communication control unit 205 controls various operations in the second communication device 20. For example, the communication control unit 205 generates the transmission data and outputs the transmission data to the transmitting unit 202. Further, for example, the communication control unit 205 acquires the receive data demodulated by the receiving unit 203 and performs a predetermined process on the basis of the receive data.

[1-2. Communication Mode of Power Line Communication]

Figure 3:
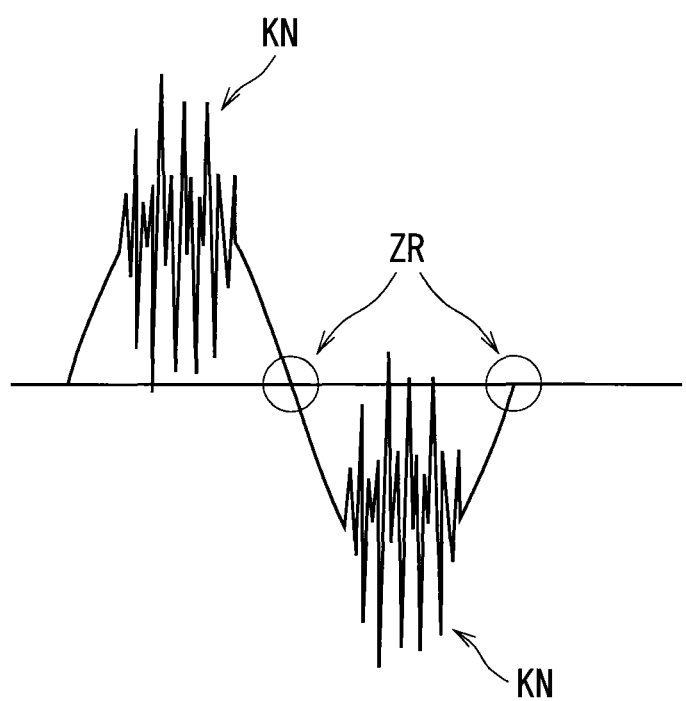
FIG. 3 is a view showing a transmission timing of a transmission signal in the communication system.
Figure 4:
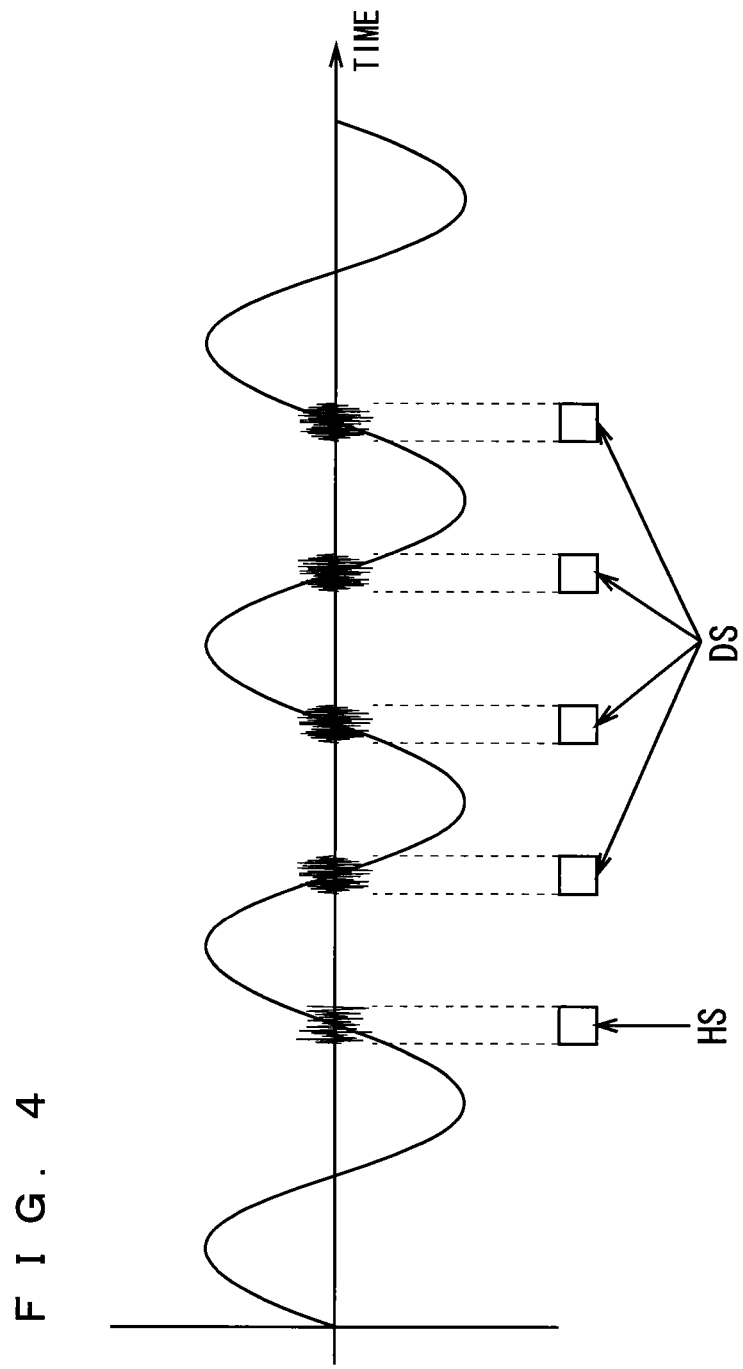
FIG. 4 is a view showing a communication mode in the communication system.
Figure 5:
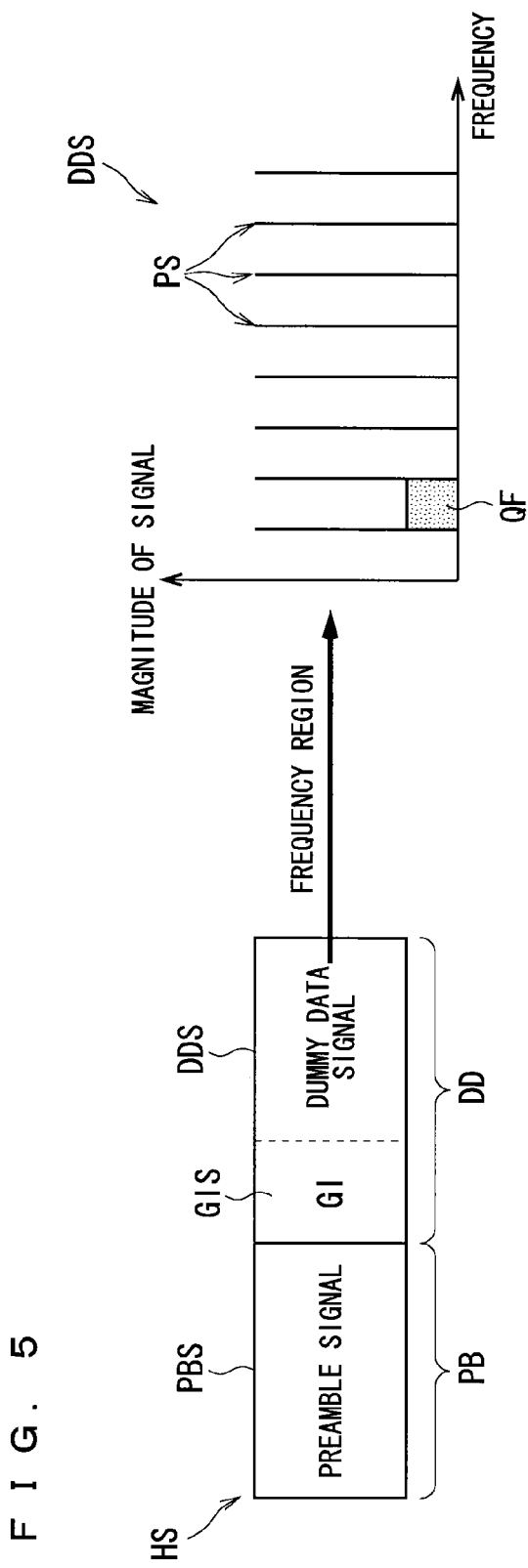
FIG. 5 is a view showing the detail of a header signal.
Figure 6:
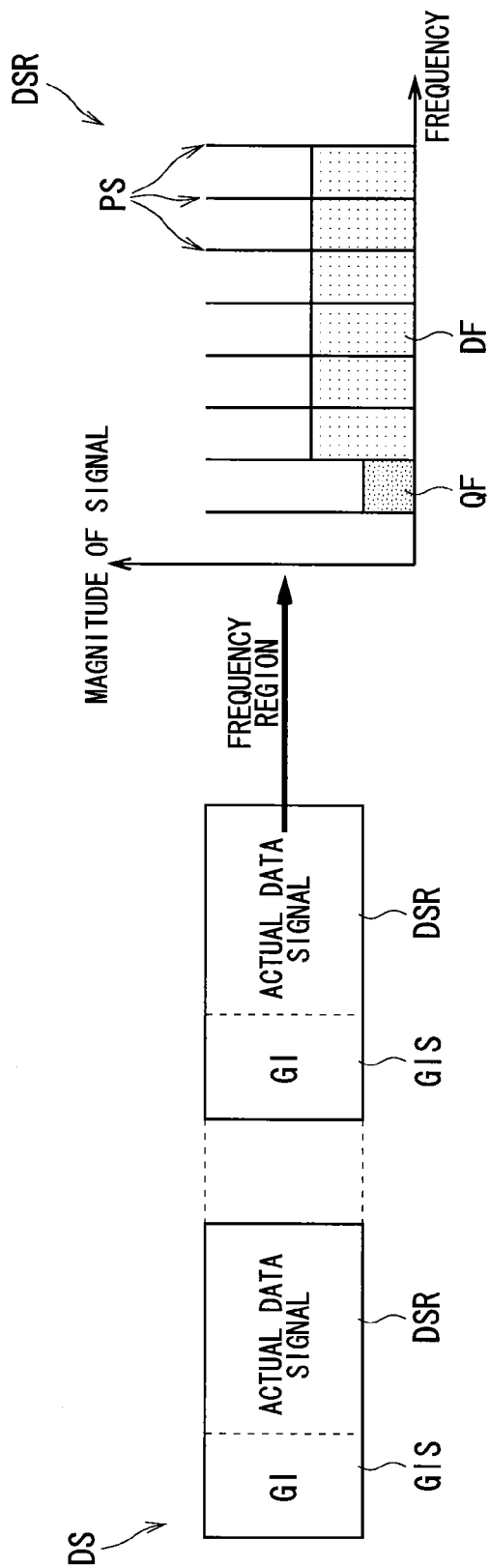
FIG. 6 is a view showing the detail of a data signal.
Figure 7:
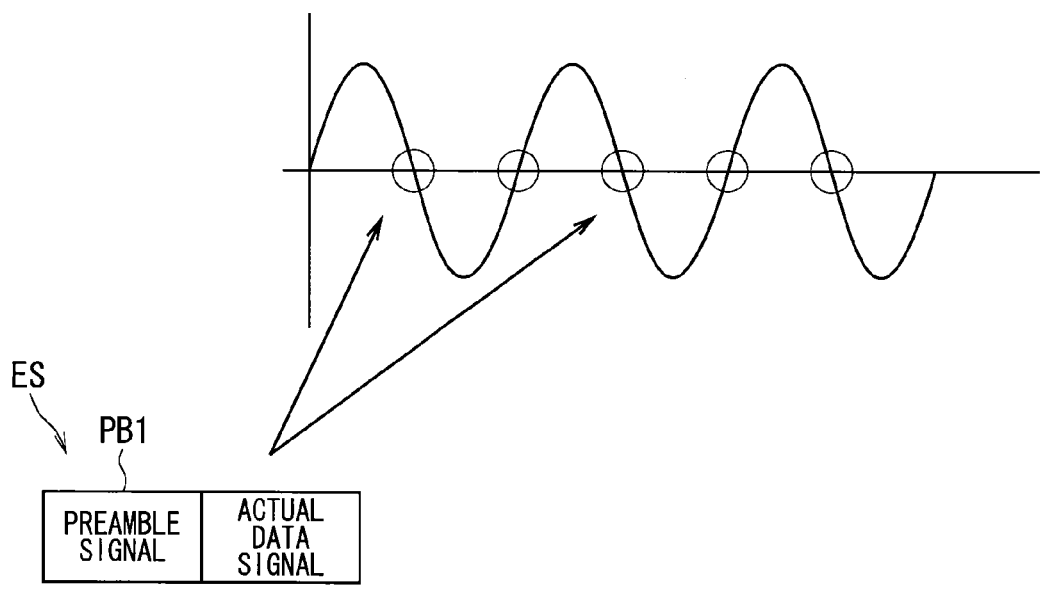
FIG. 7 is a view showing a communication mode in a communication system of Comparative Example.

Next, discussion will be made on a communication mode of the power line communication performed between the first communication device 10 and the second communication device 20 which have the above-discussed constitutions. FIG. 3 is a view showing a transmission timing of the transmission signal in the communication system 1. FIG. 4 is a view showing a communication mode in the communication system 1. FIG. 5 is a view showing the detail of a header signal, and in FIG. 5, a dummy data signal included in the header signal is shown also on the frequency axis. FIG. 6 is a view showing the detail of a data signal, and in FIG. 6, the dummy data signal included in the header signal is shown also on the frequency axis. FIG. 7 is a view showing a communication mode in a communication system of Comparative Example.

The power line communication between the first communication device 10 and the second communication device 20 is performed in a specific period in order to avoid the home appliance noise caused by electric equipments connected to the power line 30.

Specifically, as shown in FIG. 3, since the effect of the home appliance noise KN becomes larger near the peak at which the amplitude of the commercial alternating current (AC) voltage waveform reaches its peak, the power line communication between the first communication device 10 and the second communication device 20 is performed in a specific period (also referred to as a "zero crossing period") near a so-called zero crossing ZR at which the amplitude of the AC voltage waveform becomes zero.

Thus, in order to avoid the effect of the home appliance noise, the communication system 1 is configured to perform the power line communication in the zero crossing period including a zero crossing point at which the amplitude of the commercial AC voltage waveform becomes zero. Herein, the timing at which the amplitude of the commercial AC voltage waveform becomes zero is also referred to as a "zero crossing timing".

Then, as shown in FIG. 4, at the first zero crossing timing (initial zero crossing timing) for transmission, the first communication device 10 transmits the header signal HS as the transmission signal.

As shown in FIG. 5, the header signal HS consists of a preamble portion PB and a dummy data portion DD.

A signal (preamble signal) PBS of the preamble portion PB consists of repeated OFDM signals which are generated on the basis of the same OFDM symbol. The preamble signal PBS is used in the receiving device for various synchronization processes such as the frequency synchronization, the symbol timing synchronization, and the like.

On the other hand, a signal (dummy signal) of the dummy data portion DD consists of the dummy data signal DDS and a guard interval (GI) GIS. The dummy data signal DDS is a signal generated on the basis of one OFDM symbol generated in the modulation unit 123, which includes a pilot signal used for transmission line estimation and auxiliary information indicating the zero crossing interval.

The dummy data signal DDS in a unit of OFDM symbol is expressed on the frequency axis in FIG. 5, and FIG. 5 shows a plurality of pilot signals PS distributed in a plurality of subcarriers constituting the OFDM signal and the auxiliary information QF disposed over several adjacent subcarriers. Though FIG. 5 shows a case where the dummy data signal DDS includes the pilot signal PS and the auxiliary information, the dummy data signal DDS may include other information besides the pilot signal PS and the auxiliary information. Further, the manner in which the pilot signal PS and the auxiliary information QF in the dummy data signal DDS are allocated to a plurality of subcarriers constituting the OFDM signal is not limited to that shown in FIG. 5, but other manners may be adopted.

As shown in FIG. 4, at each zero crossing timing after the header signal is transmitted, the first communication device 10 transmits the data signal DS as the transmission signal, instead of the header signal HS.

The data signal DS to be transmitted at one zero crossing timing is generated on the basis of one OFDM symbol or a plurality of OFDM symbols. FIG. 6 shows a signal generated on the basis of a plurality of serial OFDM symbols, as the data signal DS to be transmitted at one zero crossing timing.

Each data signal in a unit of OFDM symbol consists of an actual data signal (transmission actual data signal) DSR transmitted from the transmitting device to the receiving device and guard interval GIS.

The actual data signal DSR in each data signal is a signal generated on the basis of one OFDM symbol generated in the modulation unit 123, which includes the pilot signal, the auxiliary information indicating the zero crossing interval, and actual data.

The actual data signal DSR in a unit of OFDM symbol is expressed on the frequency axis in FIG. 6, and FIG. 6 shows a plurality of pilot signals PS distributed in a plurality of subcarriers constituting the OFDM signal and the auxiliary information QF and the actual data DF which are superimposed on subcarriers other than the subcarrier on which the pilot signal PS is superimposed. Further, the manner in which the pilot signal PS, the auxiliary information QF, and the actual data DF in the actual data signal DSR are allocated to a plurality of subcarriers constituting the OFDM signal is not limited to that shown in FIG. 6, but other manners may be adopted.

Thus, in the communication system 1, at the first zero crossing timing for transmission, the header signal HS having the preamble portion to be used for various synchronization processes is transmitted, and at the zero crossing timings after the header signal HS is transmitted, the data signal DS having no preamble portion for various synchronization processes is transmitted. By this transmission, since the actual data can be transmitted instead of the preamble signal as compared with a case shown in FIG. 7 where a transmission signal ES having a preamble portion PB1 (a transmission signal including the preamble signal) is transmitted at each zero crossing timing, it is possible to increase the transmission efficiency.

Assuming that the frequency of a commercial power supply is 60 Hz (one cycle of the commercial power supply is about 16 ms), for example, a period which can be used for transmission at one zero crossing timing is about 4 ms. Further, assuming that the number of FFT points is 128 and the number of FFT sampling clocks is 1.2 MHz, a subcarrier spacing frequency is about 10 KHz and a period per one OFDM symbol is 100 μs. Herein, assuming that the number of OFDM symbols required for transmission of the preamble signal is "10", a transmission period of the preamble signal is 1 ms.

Thus, since the transmission period of the preamble signal is 1 ms among the transmission period of about 4 ms which can be used for transmission at one zero crossing timing, when the actual data can be transmitted instead of the preamble signal in the transmission period of the preamble signal, the transmission efficiency is increased by 20%. The number of OFDM symbols ("10") required for transmission of the preamble signal, which is used herein, is an average value and may be changed in accordance with standards or modes.

Further, in the conventional power line communication near the zero crossing in which a transmission signal including a preamble signal is transmitted at each zero crossing timing, since sufficient transmission capacity cannot be ensured, there are few cases where the conventional power line communication near the zero crossing is implemented. For this reason, actually, there are many cases where a noise removal filter for avoiding the effect of the home appliance noise is provided and the communication is performed near the peak at which the amplitude of the commercial AC voltage waveform reaches its peak.

In the present communication system 1, however, since sufficient transmission capacity can be ensured in the power line communication at the zero crossing timing because of the increase in the transmission efficiency, it is not necessary to perform communication near the peak at which the amplitude of the commercial AC voltage waveform reaches its peak. In other words, by adopting the mode of the present communication system 1, since any circuit for noise suppression such as the noise removal filter or the like for avoiding the effect of the home appliance noise in the communication device is not needed, it is possible to reduce the price and size of the communication device.

Further, since the power line communication adopted in the communication system 1 is wired communication in which the power line 30 is used as the transmission line, there is no effect of multipath. For this reason, by using the information (in detail, error information of the carrier frequency) on the frequency synchronization performed by using the preamble signal PBS included in the header signal HS which is first received, it is possible to remove the error of the carrier frequency without performing another frequency synchronization process on the data signal DS which is received at each zero crossing timing after the header signal HS is received. In other words, it is possible to perform the multicarrier demodulation process without performing another frequency synchronization process on the data signal DS which is received at each zero crossing timing.

Furthermore, in the communication system 1, the transmission signal is transmitted at each zero crossing timing. For this reason, in the receiving device, after the symbol timing synchronization is established by using the preamble signal PBS included in the header signal HS, it is possible to perform the multicarrier demodulation process without performing another symbol timing synchronization process on each transmission signal (data signal DS) transmitted at each zero crossing timing.

Specifically, after the symbol timing synchronization is established by using the preamble signal PBS, the receiving device holds symbol timing synchronization information (in detail, symbol synchronization timing) obtained by the symbol timing synchronization. Then, the receiving device measures therein a known zero crossing interval specified on the basis of a known frequency of the commercial power supply, and specifies the symbol synchronization timing of each transmission signal transmitted at each zero crossing timing by using the measured zero crossing interval and the held symbol synchronization timing, to thereby perform the multicarrier demodulation process.

Further, the transmission signal is transmitted while a specific position of the transmission signal in time series and the zero crossing timing has a certain relation. Specifically, the transmission signal is transmitted so that a lead position of the transmission signal (a starting position of the guard interval GIS) and the zero crossing timing may be coincident with each other. Alternatively, the transmission signal is transmitted so that a center position of the guard interval GIS in the transmission signal and the zero crossing timing may be coincident with each other. Since the distance between the specific positions of the transmission signals transmitted at adjacent zero crossing timings is thereby equal to the zero crossing interval, the receiving device can specify a receiving timing of the transmission signal to be transmitted at each zero crossing timing by using the zero crossing interval.

Thus, in the communication system 1, the symbol timing synchronization is established by using the preamble signal PBS included in the first transmission signal (header signal HS) at the start of transmission. After the symbol timing synchronization is established, the symbol synchronization timing is held and by using the symbol synchronization timing, the multicarrier demodulation process can be performed without performing another symbol timing synchronization process on the dummy signal included in the header signal HS. Further, it is also possible to perform the multicarrier demodulation process on the data signal DS by using the held symbol synchronization timing and the zero crossing interval without performing another symbol timing synchronization process thereon.

Furthermore, in the communication system 1, though the multicarrier demodulation process can be performed by using the known zero crossing interval as discussed above, the multicarrier demodulation process may be performed by using a zero crossing interval specified by using the auxiliary information QF. When the multicarrier demodulation process is performed by using the zero crossing interval specified by using the auxiliary information QF, since the multicarrier demodulation process is performed by using the zero crossing interval in consideration of variation in the power supply cycle of the commercial power supply, it is possible to perform the multicarrier demodulation process with higher accuracy.

[1-3. Operation of Specifying Zero Crossing Interval Using Auxiliary Information]

Figure 8:
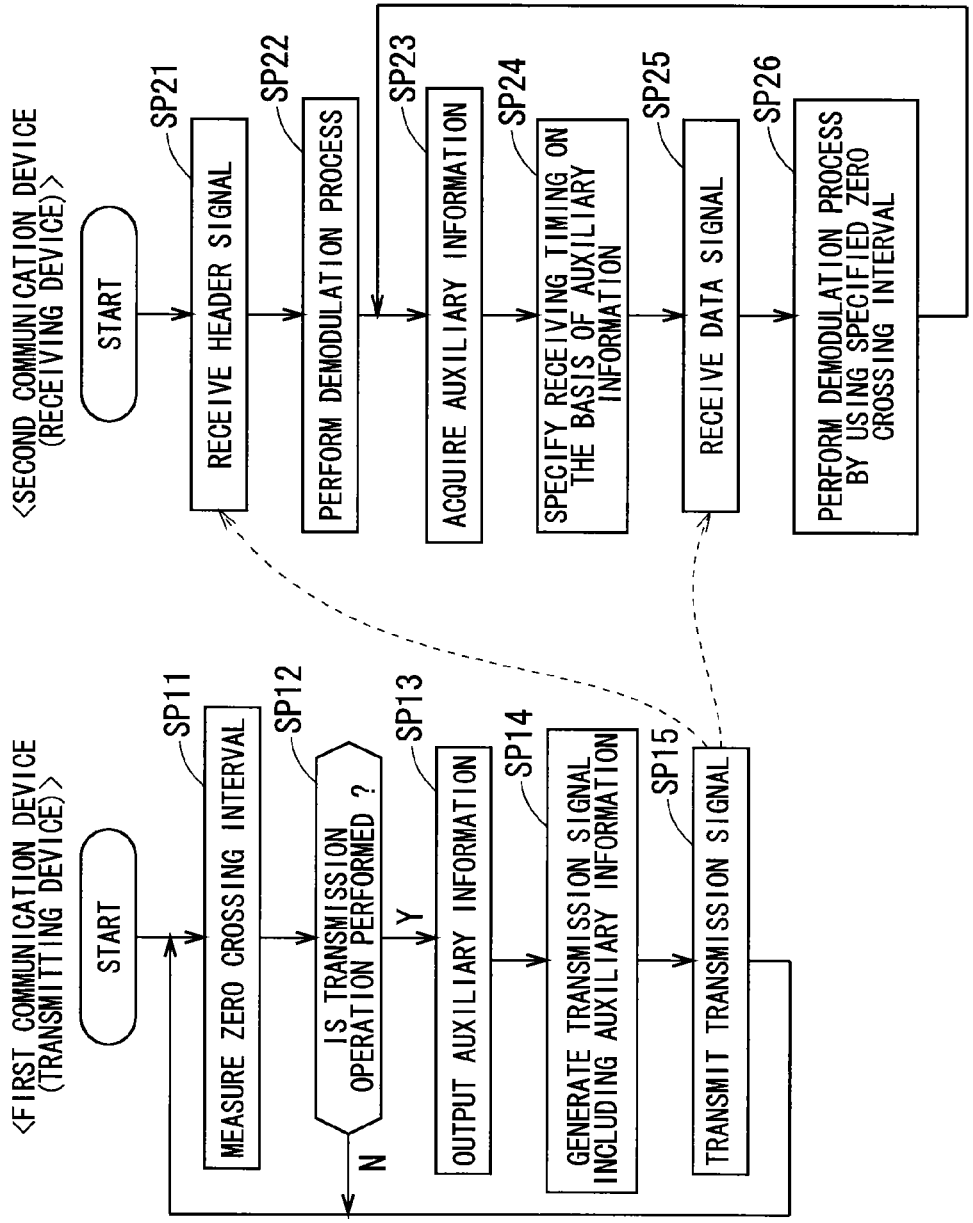
FIG. 8 is a flowchart showing an operation of the communication system.
Figure 9:
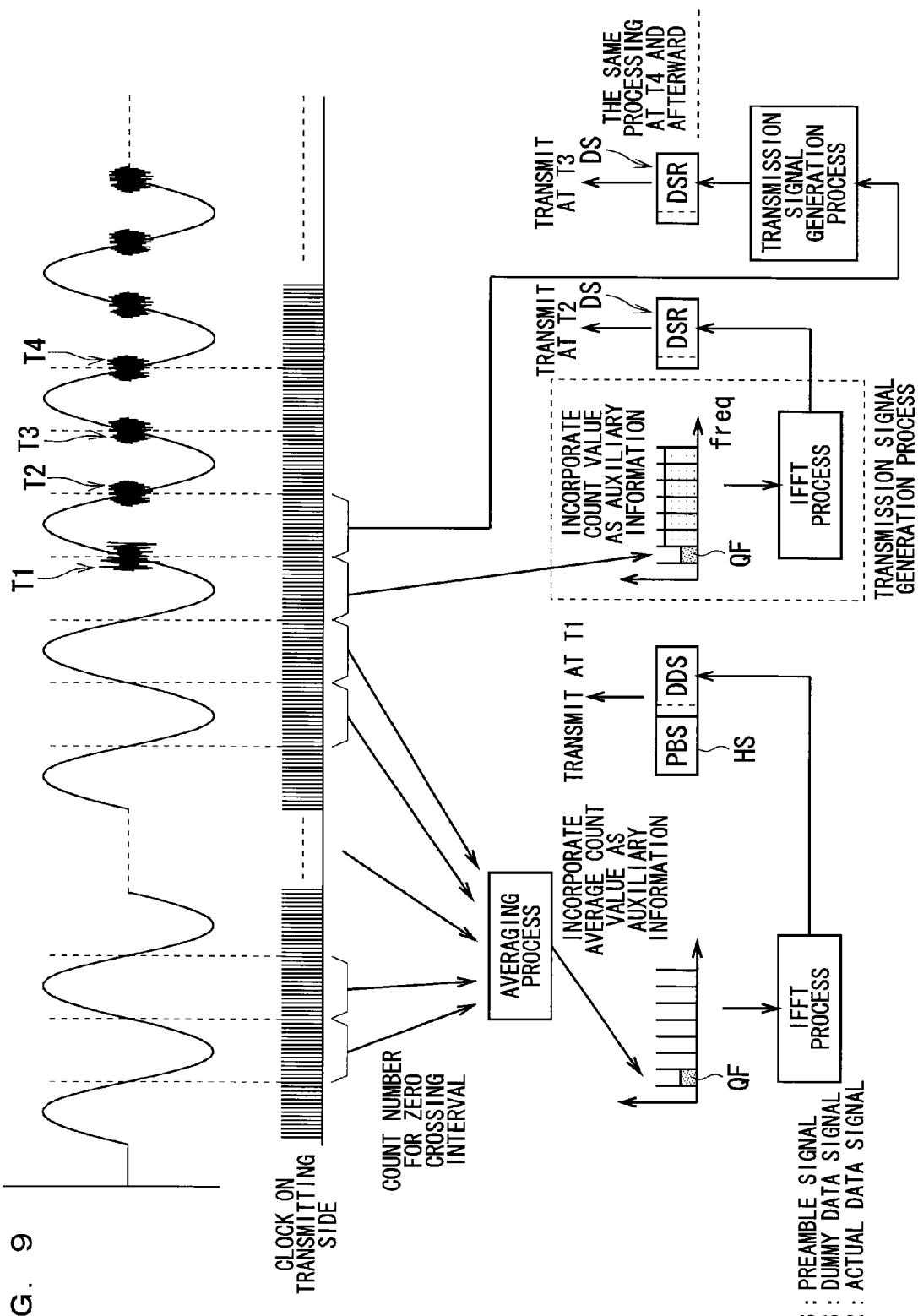
FIG. 9 is a view showing an operation outline of the first communication device.
Figure 10:
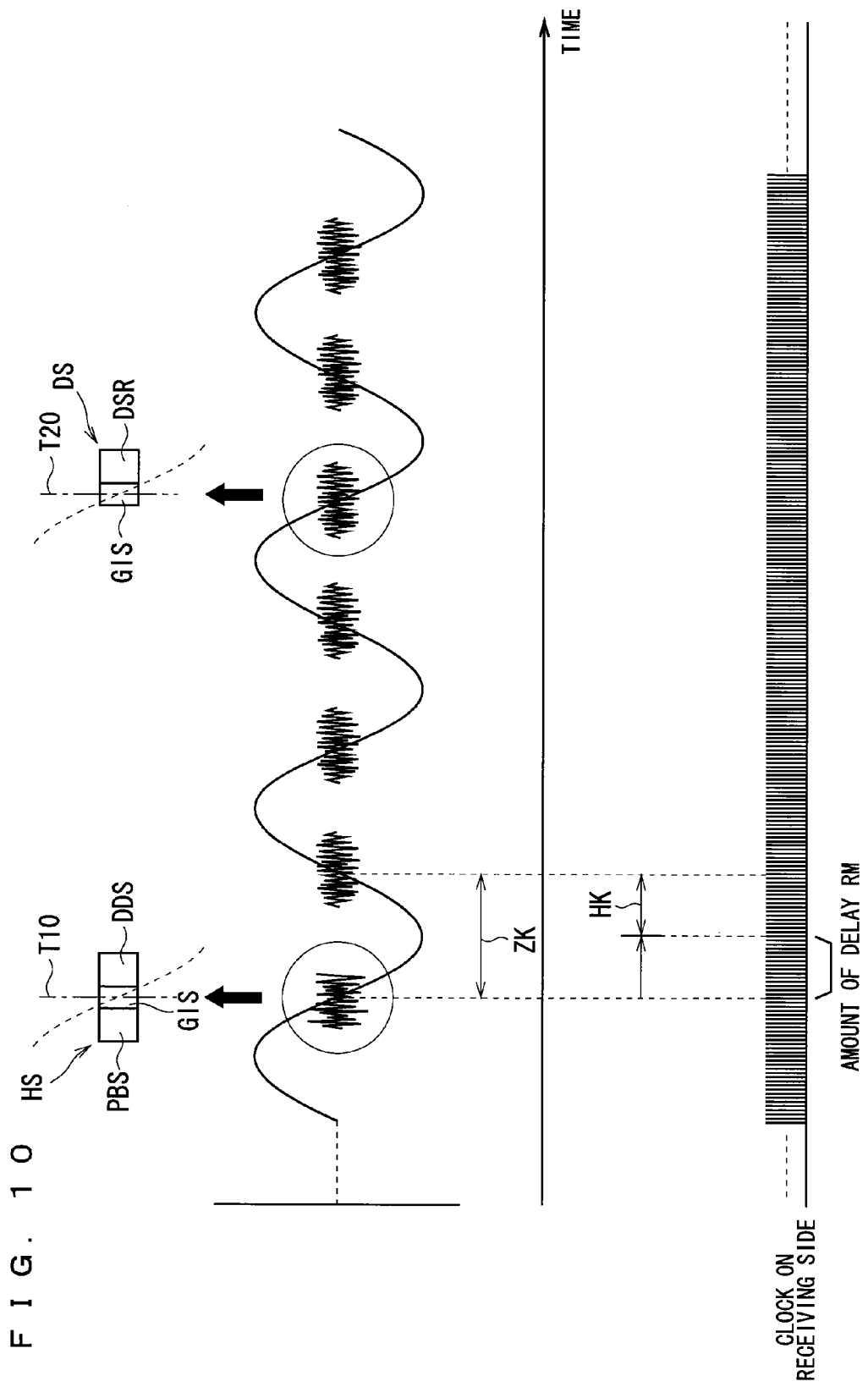
FIG. 10 is a view showing an operation outline of the second communication device.

Hereinafter, discussion will be made on an operation of the communication system 1 for performing the multicarrier demodulation process by using the zero crossing interval specified by using the auxiliary information QF. FIG. 8 is a flowchart showing the operation of the communication system 1. In FIG. 8, an operation of the first communication device 10 serving as the transmitting device is shown on the left side and an operation of the second communication device 20 serving as the receiving device is shown on the right side. FIG. 9 is a view showing an operation outline of the first communication device 10, and FIG. 10 is a view showing an operation outline of the second communication device 20.

As shown in FIG. 8, the transmitting device (herein, the first communication device 10) which is a constituent element of the communication system 1 first measures the zero crossing interval in Step SP11. The measurement of the zero crossing interval is performed by cooperation of the zero crossing detection unit 121 and the auxiliary information generation unit 122.

Specifically, the auxiliary information generation unit 122 generates the zero crossing interval on the basis of the detection signal inputted from the zero crossing detection unit 121 in response to detection of the zero crossing. As discussed above, the generated zero crossing interval is represented by a count value which is obtained by counting the number of clocks of the clock signals between the two adjacent zero crossing timings.

As shown in FIG. 9, the detection of the zero crossing interval is repeatedly performed at each zero crossing timing before a transmission operation for transmitting the transmission signal is performed (started).

Then, the auxiliary information generation unit 122 performs an averaging process on the count value obtained every time between the adjacent zero crossing timings, i.e., the count value indicating each zero crossing interval. The averaged count value (average count value) is used as the auxiliary information QF indicating the zero crossing interval before the transmission signal is transmitted.

In the next Step SP12, when the execution (the start) of the transmission operation for transmitting the transmission signal is detected, the process goes to Step SP13.

In Step SP13, the auxiliary information generation unit 122 outputs the auxiliary information QF.

In Step SP14, the transmitting unit 102 generates the transmission signal including the auxiliary information QF. The transmission signal generated in the first Step SP14 is the header signal HS, and the auxiliary information QF is incorporated in the dummy data signal DDS in the header signal HS (see FIG. 9). The header signal HS is transmitted to the receiving device at the first zero crossing timing T1 after the start of the transmission operation in the next Step SP15.

After the process of Step SP15 is finished, the process goes to Step SP11, and the process steps of Steps SP11 to SP15 are performed. In other words, in Steps SP11 to SP15 executed after the process of Step SP15 is finished, the auxiliary information QF to be transmitted at the next zero crossing timing T2 is generated, and the data signal DS in which the auxiliary information QF is incorporated is transmitted at the zero crossing timing T2.

After that, in a series of transmission operations, the respective processes in Steps SP11 to SP15 are repeatedly performed, and the transmission signals (data signals DS) each including the auxiliary information QF are transmitted at zero crossing timings T3 and T4, respectively, from the transmitting device.

Further, the auxiliary information QF to be transmitted at the zero crossing timing after the first zero crossing timing T1 at which the header signal HS is transmitted may be obtained by averaging the count values of the past zero crossing intervals or may be a count value of only the last zero crossing interval.

On the other hand, when the receiving device (herein, the second communication device 20) which is a constituent element of the communication system 1 receives the header signal HS in Step SP21, the process goes to Step SP22.

In Step SP22, the frequency synchronization and the symbol timing synchronization are performed by using the preamble signal PBS included in the header signal HS. After these synchronizations are established, the demodulation process is performed on the dummy signal included in the header signal HS.

Then, in Step SP23, the communication control unit 205 acquires the auxiliary information from the demodulated receive data.

In the next Step SP24, the communication control unit 205 specifies the receiving timing of the next transmission signal on the basis of the auxiliary information.

Specifically, the communication control unit 205 uses the count value given by the auxiliary information acquired from the receive data as the zero crossing interval from the receiving of the header signal HS to the receiving of the next data signal DS.

Then, the receiving device has a clock generator (not shown) for generating a clock signal and uses the clock signal in order to actually grasp the zero crossing interval. In other words, by counting the clocks corresponding to the count value given by the auxiliary information by using the clock signals generated in the receiving device, the receiving timing of the next transmission signal is specified.

Further, since the receiving device performs the demodulation process and the like to acquire the auxiliary information, the receiving device takes a predetermined time from the receiving of the header signal HS to the specifying of the zero crossing interval. For this reason, in order to actually specify the receiving timing, the receiving device counts the number of clocks corresponding to the value obtained by subtracting the amount of delay corresponding to the predetermined time needed to specify the zero crossing interval from the specified zero crossing interval. In more detail, as shown in FIG. 10, assuming that it takes the amount RM of delay corresponding to the predetermined time to specify the zero crossing interval ZK, the receiving device counts the number of clocks corresponding to a value HK obtained by subtracting the amount RM of delay from the zero crossing interval ZK, by using the clock signals, to thereby specify the receiving timing of the next transmission signal. Thus, the operation of specifying the receiving timing of the next transmission signal in consideration of the amount of delay required to specify the zero crossing interval is also performed in a receiving process for the data signal DS.

Further, it is preferable that the transmission signal should be transmitted so that a center position of the guard interval GIS in the transmission signal and the zero crossing timing may be coincident with each other. As shown in FIG. 10, for example, the header signal HS is transmitted so that a center position of the guard interval GIS in the header signal HS and the zero crossing timing T10 may be coincident with each other. Furthermore, the data signal DS is transmitted so that a center position of the guard interval GIS in the data signal DS and the zero crossing timing T20 may be coincident with each other.

With this operation, since the number of clocks corresponding to the zero crossing interval is counted with the center of the guard interval GIS as a reference (starting point of counting), it is not necessary to consider an error (error due to asynchronization) caused by that the clock signal in the transmitting device and the clock signal in the receiving device are asynchronous to each other. Further, though the accuracy of specifying the zero crossing interval is increased as a clock interval between the clock signals in the transmitting device and the receiving device becomes shorter, the clock interval in which there are several clocks in the period of the guard interval GIS may be used.

With reference back to FIG. 8, in Step SP25, when the data signal DS is received, the process goes to Step SP26.

In Step SP26, the multicarrier demodulation process is performed on the received data signal DS by using the zero crossing interval specified on the basis of the auxiliary information and the information (i.e., the symbol synchronization timing) obtained in the symbol timing synchronization process of Step SP22. The equalization process and the subcarrier demodulation process are performed on the data signal after being subjected to the multicarrier demodulation process, to thereby generate the receive data.

After the process of Step SP26 is finished, the process goes to Step SP23, and new auxiliary information is acquired from the receive data. After that, when the zero crossing interval is specified on the basis of the new auxiliary information (in Step SP24) and the next data signal DS is received (in Step SP25), the subcarrier demodulation process is performed by using the zero crossing interval specified on the basis of the above-discussed new auxiliary information.

Thus, the processes in Steps SP23 to SP26 are repeatedly performed on the data signals DS which are sequentially acquired at zero crossing timings, respectively. With this operation, the multicarrier demodulation process using the zero crossing interval specified on the basis of the last auxiliary information is performed on the data signal DS acquired at each zero crossing timing.

As discussed above, the transmitting device transmits the header signal HS or the data signal DS in which the auxiliary information indicating the zero crossing interval is incorporated, to the receiving device. The receiving device acquires the zero crossing interval from the auxiliary information incorporated in the header signal HS or the data signal DS, specifies the symbol synchronization timing of the next data signal DS by using the zero crossing interval and the symbol synchronization timing of the present signal, and performs the multicarrier demodulation process on the data signal DS.

The zero crossing interval may vary due to the effects of inductive load or capacitive load of each electric equipment connected to the power line 30. As discussed above, however, when the zero crossing interval which is actually detected in the transmitting device is transmitted to the receiving device and the multicarrier demodulation process is performed by using the actually-detected zero crossing interval, it is possible to specify the symbol synchronization timing with high accuracy in accordance with the variation of the zero crossing interval and thereby possible to perform the multicarrier demodulation process with high accuracy.

2. Variations

Though the preferred embodiment of the communication system 1 has been discussed above, this preferred embodiment allows the following variations.

Figure 11:
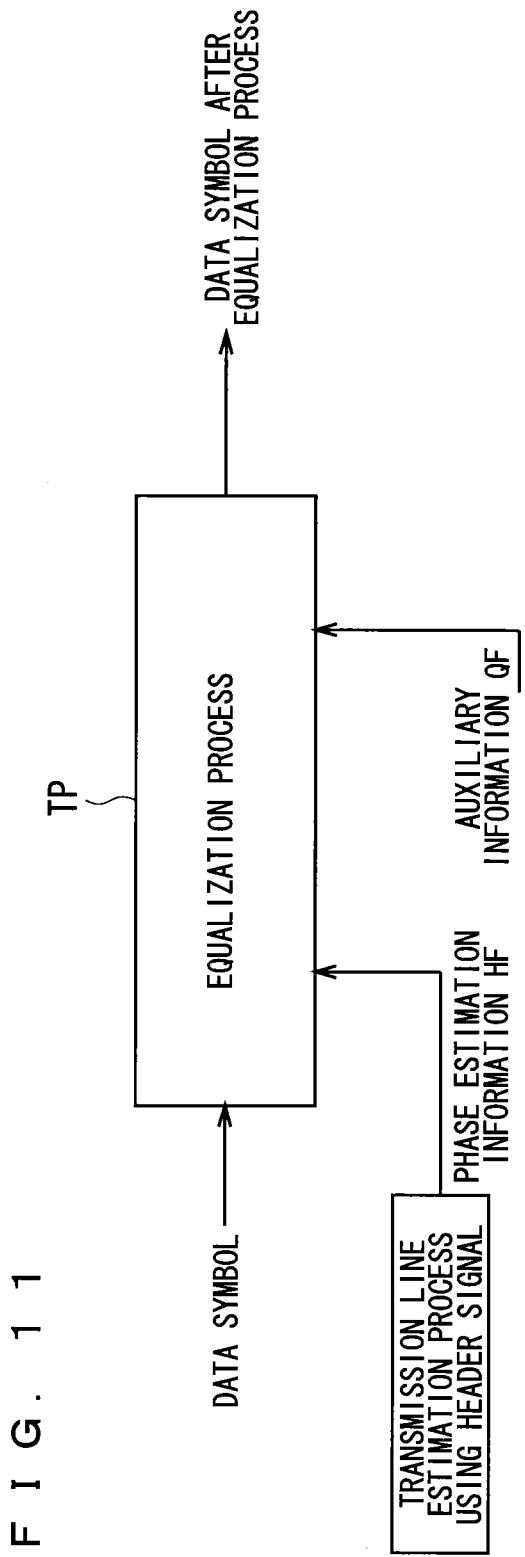
FIG. 11 is a view showing an outline of an equalization process in accordance with a variation.

Though the pilot signal PS is included in the data signal DS as well as in the header signal HS and the transmission line estimation process is also performed when the data signal DS is received in the above-discussed preferred embodiment, for example, this is only one exemplary case. FIG. 11 is a view showing an outline of an equalization process in accordance with a variation.

Specifically, as discussed above, since the power line communication adopted in the communication system 1 is wired communication in which the power line 30 is used as the transmission line, there is no effect of multipath. For this reason, in the power line communication of the communication system 1, unlike in wireless communication, there is a good possibility that the quality of the transmission line is not relatively deteriorated.

Then, by performing the equalization process on the data signal DS by using the estimated transmission line characteristics obtained by the transmission line estimation process using the header signal HS, reduced number of pilot signals PS or no pilot signal PS may be included in the data signal DS. Specifically, the receiving device holds the estimated transmission line characteristics obtained by the transmission line estimation process using the header signal HS. Then, for the data signal DS, performed is an equalization process of correcting a phase of each data symbol included in the data signal DS by using the transmission line estimation information (phase estimation information) on the phase included in the estimated transmission line characteristics which is held.

Furthermore, since the communication system 1 is configured to transmit the data signal DS at each zero crossing timing, the data signal DS transmitted at each zero crossing timing is not a signal generated on the basis of a series of OFDM symbols. For this reason, by performing only correction of the phase of each data symbol included in the data signal DS by using the phase estimation information as discussed above, there arises a phase shift from the timing of acquiring the header signal HS to the timing of acquiring the data signal DS to be subjected to the equalization process, and it is not therefore possible to sufficiently remove the effect of transmission line characteristics on the phase of each data symbol.

Then, in the equalization process of the present variation, the phase of the data symbol is corrected by using auxiliary information having temporal phase-shift information between the zero crossings as well as the phase estimation information.

Specifically, as shown in FIG. 11, in the equalization process TP of the present variation, the phase of the data symbol is corrected by using the auxiliary information QF which has been already acquired in the receiving device, as well as the phase estimation information HF obtained by the transmission line estimation process EP using the header signal HS. In the equalization process TP, the operation expressed by the following Eq. (1) is performed, to thereby remove the effect of the transmission line characteristics on the phase of the data symbol.

$$Ds'(t) = Ds(t) * \exp\left(-j\frac{2\pi f(t)}{N} - p(t)\right) \quad \text{Eq. (1)}$$

In Eq. (1), "Ds'(t)" represents a data symbol after being subjected to the equalization process, "Ds(t)" represents a data symbol before being subjected to the equalization process, "f(t)" represents the phase estimation information HF, "p(t)" represents time information from the timing of acquiring the header signal HS to the timing of acquiring the data signal DS to be subjected to the equalization process, which is obtained from the auxiliary information which has been already acquired in the receiving device, and "N" represents the number of samples. In Eq. (1), since the elements in Eq. (1) are expressed as functions in the time region for convenience of expression, Eq. (1) is an expression for obtaining the data symbol "Ds'(t)" after the equalization process by convolution operation of the data symbol "Ds(t)" before the equalization process and the estimated transmission line characteristics on the phase.

Thus, by performing the equalization process on the data signal DS by using the estimated transmission line characteristics obtained by the transmission line estimation process using the header signal HS and the auxiliary information, it is possible to eliminate the necessity of the transmission line estimation process using the data signal DS. Since reduced number of pilot signals PS or no pilot signal PS may be thereby included in the data signal DS, it is possible to increase the transmission capacity for transmitting the actual data by reduction in the number of pilot signals PS. In other words, it is possible to increase the transmission efficiency of the actual data.

Further, by correcting the phase of the data symbol by using the auxiliary information QF which has been already acquired in the receiving device as well as the phase estimation information HF, it is also possible to increase the accuracy of the phase correction of the data symbol.

Furthermore, the following operation mode may be added to the communication system 1.

Specifically, in the first communication device 10, the auxiliary information QF generated by the auxiliary information generation unit 122 is inputted to the communication control unit 105, and the communication control unit 105 monitors the zero crossing interval by using the auxiliary information QF. Then, the first communication device 10 performs various operations in accordance with the condition of the zero crossing interval. As an example of the operation, when the zero crossing interval largely varies, the first communication device 10 may transmit the auxiliary information QF including status information notifying the stop of the communication.

Further, there may be another operation mode in which when the second communication device 20 detects a receive error of the transmission signal, the second communication device 20 transmits the error information to the first communication device 10 to cause the unreceived transmission signal to be retransmitted.

Furthermore, though the case has been discussed where the auxiliary information QF is always incorporated in the header signal HS or the data signal DS in the above-discussed preferred embodiment, this is only one exemplary case.

Specifically, there may be still another operation mode in which in the first communication device 10, the auxiliary information QF generated by the auxiliary information generation unit 122 is inputted to the communication control unit 105 and the communication control unit 105 monitors the zero crossing interval by using the auxiliary information QF, and the first communication device 10 incorporates the auxiliary information QF in the header signal HS or the data signal DS only when the zero crossing interval largely varies.

With this operation, there arises a possibility that the actual data may be transmitted instead of the auxiliary information QF, and it is possible to further increase the transmission efficiency as compared with the case where the auxiliary information QF is always incorporated in the header signal HS or the data signal DS.

While the invention has been shown and described in detail, the foregoing description is in all aspects illustrative and not restrictive. It is therefore understood that numerous modifications and variations can be devised without departing from the scope of the invention.

DESCRIPTION OF REFERENCE NUMERALS 1 communication system
10 first communication device
20 second communication device
102, 202 transmitting unit
103, 203 receiving unit
104, 204 synchronization unit
105, 205 communication control unit
121 zero crossing detection unit
122 auxiliary information generation unit
123 modulation unit
230 FFT unit
231 transmission line estimating unit
232 equalization unit
233 demodulation unit
30 power line
HS header signal
DS data signal
QF auxiliary information

The invention claimed is:

1. A communication system comprising:
 a first communication device; and
 a second communication device configured to perform power line communication using a power line as a transmission line with said first communication device, wherein
 said first communication device has:
 first circuitry configured to
  detect a zero crossing timing of a commercial power supply; and
  transmit a transmission signal modulated in OFDM mode at said zero crossing timing, and wherein the circuitry first transmits a first transmission signal having a preamble as said transmission signal when said power line communication is started, and transmits a second transmission signal having no preamble as said transmission signal after said first transmission signal is transmitted, and
 said second communication device has second circuitry configured to perform a demodulation process on said transmission signal which is received, to thereby obtain receive data.

2. The communication system according to claim 1, wherein
 the second circuitry
 performs a symbol synchronization process by using said preamble of said first transmission signal, to thereby acquire symbol synchronization information,
 and when said second transmission signal is received, the second circuitry specifies a symbol synchronization timing for said second transmission signal which is received, by using a zero crossing interval indicating an interval between adjacent zero crossing timings and said symbol synchronization information, to thereby perform said demodulation process on said second transmission signal.

3. The communication system according to claim 2, wherein
 said zero crossing interval is an interval specified on the basis of a known frequency of a commercial power supply.

4. The communication system according to claim 2, wherein
 the first circuitry
 generates auxiliary information indicating said zero crossing interval on the basis of said zero crossing timing detected by said detection means,
 transmits said first transmission signal including said auxiliary information, performs said demodulation process on said first transmission signal including said auxiliary information, to thereby acquire said auxiliary information as said receive data, and specifies said zero crossing interval on the basis of said auxiliary information acquired by the second circuitry.

5. The communication system according to claim 4, wherein the first circuitry transmits said first transmission signal including a pilot signal, and the second circuitry estimates transmission line characteristics by using said pilot signal included in said first transmission signal which is received, to thereby acquire estimated transmission line characteristics; and performs an equalization process to correct a phase of a data symbol included in said second transmission signal, by using transmission line estimation information on a phase included in said estimated transmission line characteristics and said auxiliary information.

6. The communication system according to claim 1, wherein the first circuitry generates auxiliary information indicating a zero crossing interval on the basis of said zero crossing timing detected by said detection means, and the second circuitry performs a symbol synchronization process by using said preamble of said first transmission signal, to thereby acquire symbol synchronization information, and transmit said second transmission signal including said auxiliary information at a predetermined zero crossing timing, performs said demodulation process on said second transmission signal including said auxiliary information, to thereby acquire said auxiliary information as said receive data, and specifies a symbol synchronization timing for said second transmission signal to be transmitted at the next zero crossing timing after said predetermined zero crossing timing, by using said zero crossing interval specified on the basis of said auxiliary information which is acquired and said symbol synchronization information.

7. A communication device for performing power line communication using a power line as a transmission line, comprising:

circuitry configured to detect a zero crossing timing of a commercial power supply; and transmit a transmission signal modulated in OFDM mode at said zero crossing timing, wherein the circuitry first transmits a first transmission signal having a preamble as said transmission signal when said power line communication is started, and transmits a second transmission signal having no preamble as said transmission signal after said first transmission signal is transmitted.

8. A method of operating a communication system which includes a first communication device and a second communication device for performing power line communication using a power line as a transmission line with said first communication device, comprising the steps of:

a) detecting a zero crossing timing of a commercial power supply in said first communication device;

b) transmitting a transmission signal modulated in OFDM mode at said zero crossing timing in said first communication device; and c) performing a demodulation process on said transmission signal which is received in said second communication device, to thereby acquire receive data, wherein a first transmission signal having a preamble is first transmitted as said transmission signal when said power line communication is started and a second transmission signal having no preamble is transmitted as said transmission signal after said first transmission signal is transmitted in said step b).

* * * * *